United States Patent [19]

Mackey

[11] Patent Number: 5,062,621
[45] Date of Patent: Nov. 5, 1991

[54] ZERO DIAMETER LOCATOR POST

[75] Inventor: Donald A. Mackey, Pittsburgh, Pa.

[73] Assignee: PPG Industries, Inc., Pittsburgh, Pa.

[21] Appl. No.: 279,695

[22] Filed: Dec. 5, 1988

[51] Int. Cl.$^5$ ............................................. B23Q 3/00
[52] U.S. Cl. ................................. 269/305; 269/304; 269/315
[58] Field of Search ............... 269/303, 305, 304, 315, 269/111

[56] References Cited

U.S. PATENT DOCUMENTS

| | | | |
|---|---|---|---|
| 3,641,711 | 2/1972 | Halberschmidt et al. | 51/100 |
| 4,064,659 | 12/1977 | Ulivi | 51/277 |
| 4,200,420 | 4/1980 | Cathers et al. | 414/107 |
| 4,228,993 | 10/1980 | Cathers | 271/236 |
| 4,347,927 | 9/1982 | Landes | 198/434 |
| 4,621,797 | 11/1986 | Ziegenfuss | 269/305 |
| 4,771,669 | 9/1988 | Bianchi | 209/305 |
| 4,775,404 | 10/1988 | Klempner et al. | 45/273 |

Primary Examiner—J. J. Hartman
Attorney, Agent, or Firm—Gay Ann Spahn; Donald C. Lepiane; Andrew C. Siminerio

[57] ABSTRACT

An alignment device is provided with stop members that are rotatably supported on a block member in a manner such that said stop members contact the edge of the sheet along the axis about which the stop members rotate.

14 Claims, 2 Drawing Sheets

ZERO DIAMETER LOCATOR POST

BACKGROUND OF THE INVENTION

1. Field of the Invention

This invention relates to positioning of rigid sheet material, and in particular to accurate positioning of a glass sheet for numerical controlled cutting, edging, and/or drilling operations.

2a. Technical Considerations

Glass sheets are fabricated to various shapes to conform with the outlines required for fabricated products, such as automobile and aircraft windows and the like. To be suitable for such applications, flat glass sheets must be shaped to precisely defined curvatures dictated by the shape and outline of the frames defined in the window opening in the vehicle. Each glass shape is unique and has different peripheral configurations. As a result, in a conventional glass cutting and edging operation, the equipment must be shut down, repositioned and modified for each different glass part. In response to the need to reduce the amount of down-time during a change in the glass pattern, numerically controlled technology has been incorporated into the cutting and edging operation. This technique uses computer controls to coordinate the movement of the tools to cut and edge a glass part from a glass sheet, so that a change in glass pattern is effected by using a computer program that corresponds to the desired part. It is extremely important that the glass sheet be precisely positioned prior to any operation since the programming for the movement of the tool is based on a predetermined position of the glass sheet.

2b. Patents of Interest

U.S. Pat. No. 3,641,711 to Halberschmidt et al. teaches an apparatus for grinding the edge of a glass plate wherein the glass plate is lowered onto a support table and centered between a plurality of centering jaws.

U.S. Pat. No. 4,064,659 to Ulivi teaches an apparatus for centering sheets of glass on a machine platform, including pin carrying supports that move the pins from a rest position in which the pins are turned down below the plane of the glass sheet and retracted from the sheet to an upright working position in which the pin is advanced into engagement with the glass sheet.

U.S. Pat. Nos. 4,200,420 to Cathers et al., and 4,228,993 to Cathers teach a sheet orienting and transporting frames having a plurality of aligning devices to orient the glass relative to the frame before it is lifted and transported by the frame.

U.S. Pat. No. 4,347,927 to Landes teaches an apparatus for aligning and advancing a plastic and glass sheet assembly on a conveyer for proper entry into the receiving zone of a pressing apparatus.

SUMMARY OF THE INVENTION

The present invention discloses a sheet alignment arrangement that insures that the stop mechanism of the sheet aligning device always contacts the glass sheet edge at a predetermined, programmed location, regardless of the relative angle between the glass edge and the axis along which the stop is mounted. The stops are positioned on linear actuators to move them along a support table. The stop mechanism includes a cylindrical post rotatably positioned within a matching cylindrical cavity in a support block. A head member is eccentrically positioned at one end of the post such that the edge engaging surface of the head member is aligned with the axis of rotation of the post. When the head member contacts the edge of the sheet, the post rotates so that the contact point between the edge engaging surface of the head member and the glass edge is directly aligned with the axis of rotation of the post.

DETAILED DESCRIPTION OF THE INVENTION

The present invention is discussed in connection with a numerical controlled alignment arrangement for sheet material, but it is understood that the stop arrangement may be used in any system where precise location of the contact point between a sheet member and an alignment device is required.

Figure 1:
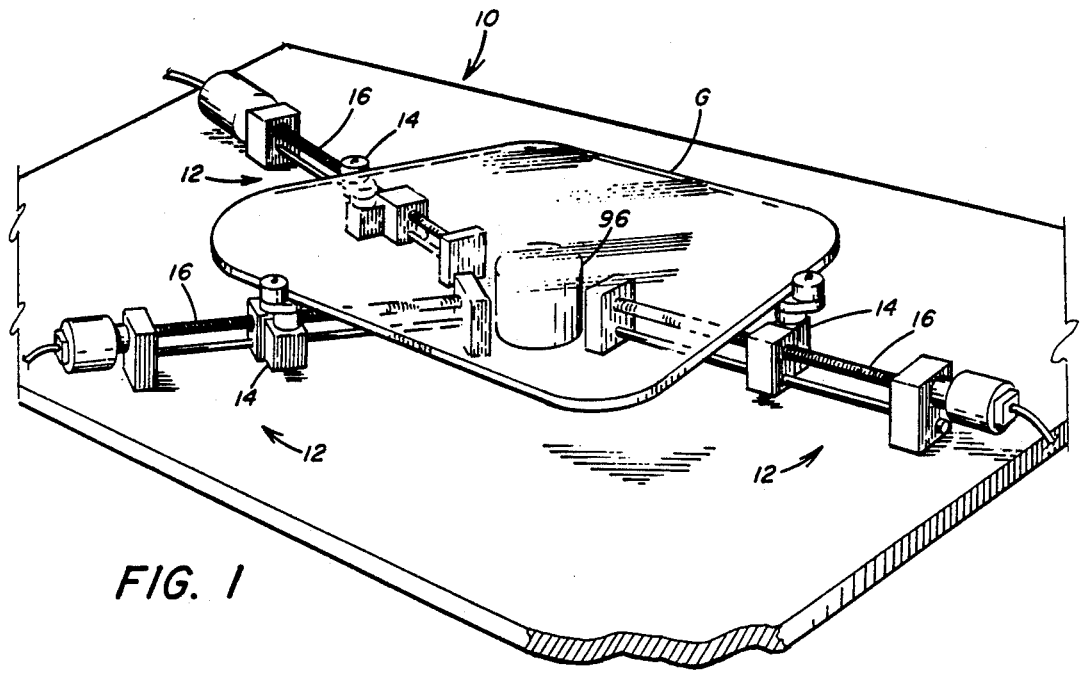
FIG. 1 is a plan view of a typical alignment table incorporating features of the present invention.
Figure 2:
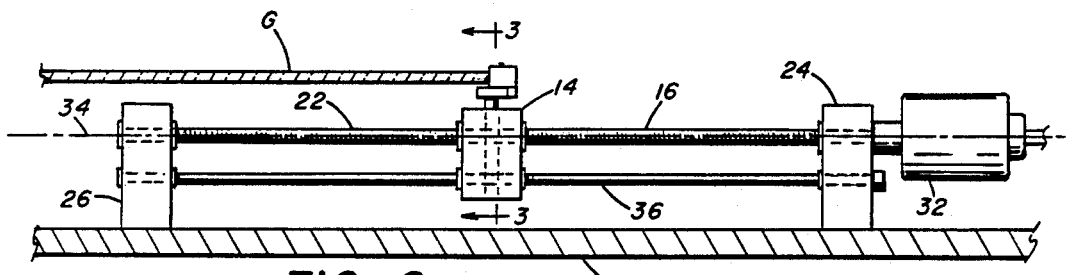
FIG. 2 is an elevational view of the stop arrangement shown in FIG. 1.

Referring to FIGS. 1 and 2, an alignment table 10 is shown with a plurality of positioning mechanisms 12 each including an alignment assembly 14 positioned to move horizontally along an axis by a linear actuator 16. Although FIG. 1 shows three positioning mechanisms, it is understood that more or less may be used as required.

Figure 3:
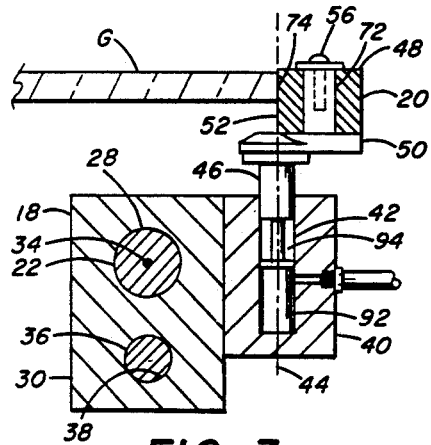
FIG. 3 is a cross-sectional view taken along line 3—3 of FIG. 2 showing the stop arrangement of the present invention.
Figure 4:
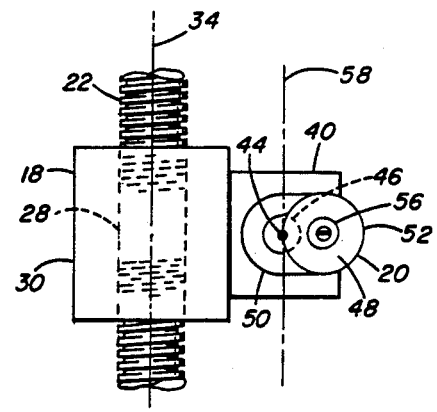
FIG. 4 is a plan view of the assembly shown in FIG. 3.

Positioning mechanism 12 includes a support assembly 18 and stop assembly 20 as shown in FIGS. 3 and 4. Although not limiting in the present invention, in the particular embodiment illustrated in FIGS. 1 through 4, the linear actuator 16 is a screw member 22 extending between supports 24 and 26 and through threaded opening 28 of block 30 of support assembly 18. Drive 32 rotates screw 22 to move the support assembly along an axis 34. Rail 36 extends between supports 24 and 26 and through sleeve 38 of block 30 to help guide the movement of the block and maintain it in an upright position while it moves along screw 22.

Referring to FIG. 3, stop assembly 20 includes a housing 40 secured to block 30, having a cylindrical cavity 42 with a longitudinal center line axis 44 through cavity 42 which extends generally vertically relative to horizontal axis 34 of screw 22 of the linear actuator 16. Stop assembly 20 further includes a shaft member 46 slidibly received within cavity 42 of housing 40 for rotation about axis 44. Head member 48 is eccentrically positioned on an extension 50 at the upper end of shaft 46 such that sheet engaging surface 52 of head member 48 passes through and is tangent to axis 44. Although not limiting in the present invention, in the particular embodiment illustrated in FIGS. 3 and 4, head member 48 is a cylindrically shaped nylon member secured to post 54 on extension 50 by screw and washer assembly 56.

The horizontal distance between axis 34 through screw 22 and axis 44 remains constant so that as block 30 moves along axis 34, the stop assembly 20 and in particular axis 44 through shaft member 46 moves along parallel axis 58 as shown in FIG. 4.

In using numerically controlled equipment, the precise shape of the glass sheet G and its exact position and orientation on the alignment table 10 is required. In order to affect such a control, the glass part to be processed must be coded or digitized in any convenient manner, for example, by laying out the part's periphery on a digitizing table and then transferring its x-y coordinates into a data file of a host computer (not shown). This file includes the exact shape of the glass part and is used as data input for post processing routines, such as cutting and edging routines. It is extremely important that the glass sheet G be precisely located on the alignment table, since the movement of the tools is based on the predetermined position and orientation of the glass sheet G on the alignment table.

Figure 5:
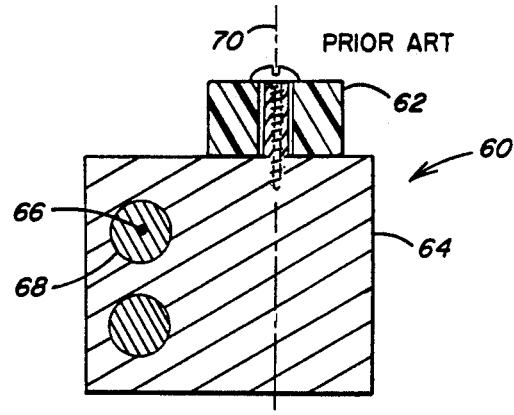
FIG. 5 is a cross-sectional view, similar to FIG. 3 showing a prior art stop arrangement.
Figure 6:
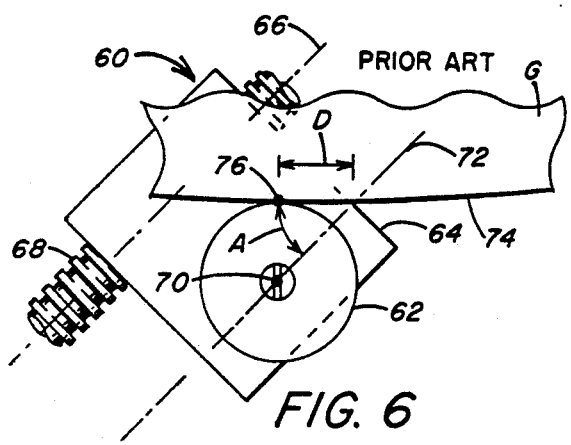
FIG. 6 is a plan view of the stop arrangement shown in FIG. 5 illustrating the orientation between the stop and a glass sheet.

FIGS. 5 and 6 illustrate a prior art stop assembly 60 which includes a head member 62 supported on block 64. Block 64 moves horizontally along axis 66 via screw member 68 and vertical axis 70 at the vertical centerline of head member 62 moves along axis 72 which parellels axis 66. As can be seen, when head member 62 is moved into contact with edge 74 of the glass sheet G, the actual contact point 76 is not at the intersection between the edge 74 and axis 72, but is offset a distance D which depends on the relative included angle A between the glass edge 74 and axis 72 and the diameter of the head member 62. As a result the offset must be recalculated for every pattern and for every stop assembly 60. The offset complicates the calculations of the programmer in positioning the mechanisms 12 to precisely locate the glass sheet G at the desired location since the actual contact point between the head member 62 of stop assembly 60 and the edge of the glass sheet G will not be aligned with the axis along which the head member 62 moves. The calculation is further complicated when the glass edge 74 has a curved configuration. It is apparent that the only time contact 76 is aligned with axis 72 is when axis 72 is perpendicular to edge 74.

Figure 7:
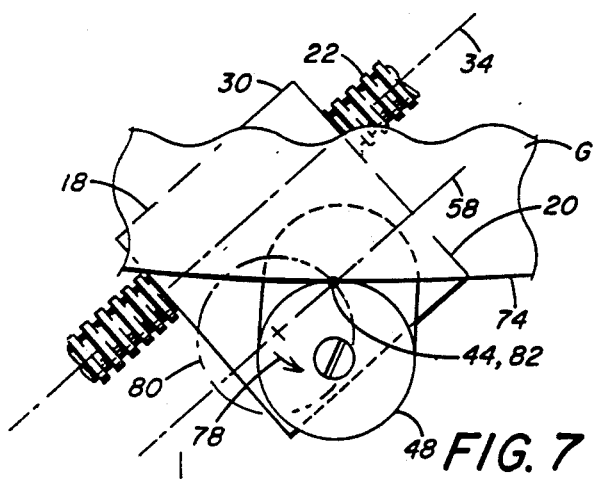
FIG. 7 is a plan view illustrating the orientation of a glass sheet and the stop arrangement shown in FIGS. 3 and 4.

FIG. 7 illustrates the positioning mechanism 12 of the present invention as it engages a glass sheet G. As can be seen, any lateral pressure applied to the head member 48 by the glass G will rotate the shaft 46 (not shown in FIG. 7) about axis 44 as indicated by arrow 78, turning the head member 48 from a first position indicated by dotted line 80 to an aligned position so that the contact point 82 between the glass edge 74 and head member 48 is always directly aligned with the axis 44 which intersects axis 58. With this configuration, the programmer will be assured that regardless of the orientation of the axes along which the positioning mechanisms move or the orientation of the glass sheet G relative to these axes or the shape of the glass sheet G, the edge 74 of the glass sheet G will intersect and remain aligned with axis 44. More particularly, the point of contact 82 between the head member 48 and glass edge 74 will always be at axis 44 along the axis 58, and the plane defined by axes 44 and 58 will be substantially normal to the edge 74 of the sheet G at the point of contact 82.

Figure 8:
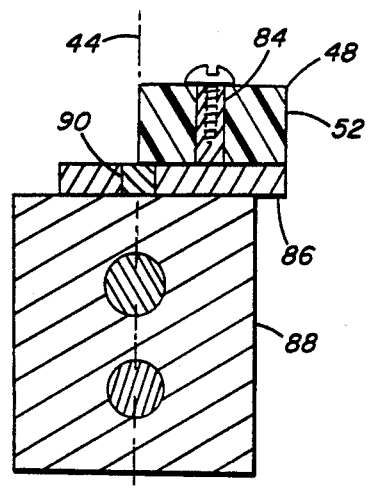
FIG. 8 illustrates an alternate embodiment of the present invention.
Figure 9:
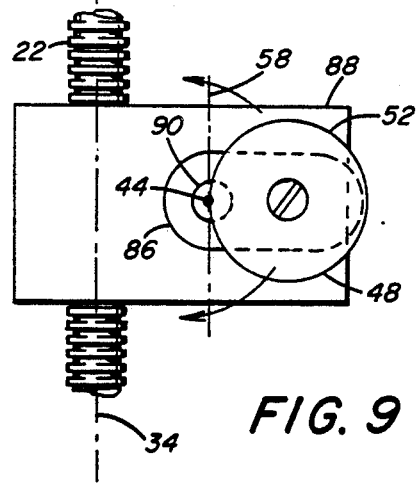
FIG. 9 is a plan view of the embodiment of the invention shown in FIG. 8.

FIGS. 8 and 9 illustrate an alternative embodiment of the present invention. In particular, head member 48 is secured at pin 84 to plate 86 which is pivotally secured to block 88 at pin 90 about axis 44. Head member 48 is sized such that its sheet engaging surface 52 is tangent to axis 44 as discussed earlier.

In the particular embodiment of the invention illustrated in FIG. 2, the horizontal movement of shaft 46 is along an axis offset from horizontal axis 34 but as can be appreciated by one skilled in the art, block 30 can be configured so as to support and move head member 48 along axis 34 such that cavity 42 and axis 44 are positioned directly above and move along axis 34.

The positioning mechanism 12 taught in the present invention may be used as an external indexing device to precisely position a glass sheet prior to it being moved to a subsequent processing station, or it may be used to precisely position a glass sheet at a station immediately prior to processing the sheet at that station, for example, cutting and/or edging. In the latter arrangement, the alignment table 10 is provided with an arrangement to move the head member 48 and glass sheet G relative to each other to expose the glass edge 74. Although not limiting in the present invention, in the particular embodiment illustrated in FIG. 3, a piston member 92 with arm 94 is positioned in cavity 42 below shaft 46. When arm 94 is fully extended, head member 48 is raised to a glass edge engaging position as shown in FIG. 3. After the glass sheet G is positioned, arm 94 is retracted and head member 48 is lowered to expose the entire edge 74 of the glass sheet G.

In operation, the positioning mechanisms 12 are moved radially outward via linear actuators 16 along axes 58 to allow a loading device (not shown), such as a robot, to initially position a glass sheet G on a support 96 of alignment table 10 within an area generally defined by the head members 48 of the stop assemblies 20. The support 96 holds the glass sheet G in place on the table 10 in any convenient manner, for example by vacuum, after it has been positioned. Drives 32 then move each of the positioning mechanisms 12 inward into engagement with the edge 74 of the glass sheet G and to a predetermined position along axis 58 to accurately position the glass sheet G on the table 10. As discussed earlier, as the head member 48 of each mechanism 12 contacts the edge 74 of the glass sheet G and continues to move inwardly to seat the glass edge 74 firmly against the sheet engaging surface 52 of head member 48, the head member 48 begins to rotate. As the mechanisms 12 continue to move inward, the glass sheet G slides on support 96 and becomes reoriented as the head members 48 push on the glass edge 74. When the mechanisms 12 have completed their inward movement, the glass sheet G is positioned at the predetermined location and orientation and the head members 48 have rotated so that the points of contact between the head members 48 and the glass edge 74 is directly aligned over an axis 58. As an alternative, in the particular embodiment of the invention illustrated in FIG. 1, two of the positioning mechanisms 12 may remain stationary and the third positioning mechanism 12 may be used to slide the glass sheet G over support 96 and into position against the stationery positioning mechanisms. If subsequent processing of the glass sheet G will take place at table 10, piston members 92 will retract arms 94 to lower the head members 48 and expose edge 74, after the sheet G is positioned.

The form of the invention shown and described in this disclosure represents an illustrative embodiment thereof. It is understood that various changes may be made without departing from the teachings of the invention defined by the claimed subject matter which follows.

I claim:

1. A device for positioning an edge of a sheet comprising:
   a support block;
   means for moving said support block along a first axis;
   a stop assembly having sheet engaging surface; and
   means for mounting said stop assembly on said support block for movement about a second axis, said second axis transverse to said first axis with said sheet engaging surface at said second axis wherein moving said support block along the first axis toward the sheet to be positioned moves said sheet engaging surface into contact with an edge of the sheet to position the sheet.

2. The device as in claim 1 further including means mounting said support block and acting on said stop assembly to move said stop assembly in a first direction along said second axis away from said support block and in a second direction opposite to the first direction along a second axis toward said support block.

3. The device as set forth in claim 1 wherein said stop assembly further includes:
   a first member, said means for mounting said stop assembly mounts said first member on said support block for movement about said second axis;
   a second member having said sheet engaging surface; and
   means for mounting said second member on said first member at a line defined as a third axis wherein said second and third axis are parallel to one another and the distance between said second and third axis is approximately equal to the distance between said sheet engaging surface and said third axis so that said sheet engaging surface is at said second axis.

4. The device as in claim 3 wherein said means for mounting said second member includes means mounting said support block and acting on said first member to move said first member in a first direction along said second axis away from said support block and in a second direction opposite to the first direction toward said support block.

5. The device as in claim 3 wherein said sheet engaging surface is curvilinear.

6. The device as in claim 3 wherein said sheet engaging surface is cylindrical.

7. The device as in claim 3 wherein said moving means include means for moving said support block along said first axis in a first direction and in an opposite direction.

8. The device as in claim 3 wherein said first axis is along a linear axis.

9. The device as in claim 3 wherein said first axis is normal to said second axis.

10. An apparatus for positioning a sheet comprising:
    a sheet support;
    a plurality of positioning devices;
    means for moving selected ones of said positioning device along a first axis toward said sheet support; and
    each of said selected ones of said positioning devices moved along said first axis comprises:
    a support block positioned on said first axis movable along said first axis toward said sheet support;
    a stop assembly having a sheet engaging surface; and
    means for mounting said stop assembly on said support block for movement about a second axis, said second axis transverse to said first axis with said engaging surface at said second axis wherein moving said support block along said first axis toward said sheet support moves said sheet engaging surface into contact with an edge of the sheet to position the sheet.

11. The apparatus as set forth in claim 10 wherein said stop assembly includes:
    a first member, said means for mounting said stop assembly mounts said first member on said support block for movement about said second axis;
    a second member having said engaging surface; and
    means for mounting said second member on said first member at a line defined as a third axis wherein said second and third axis are parallel to one another and the distance between said second and third axis is approximately equal to the distance between said engaging surface and said third axis so that said engaging surface is at said second axis.

12. The apparatus as in claim 11 wherein said moving means includes means to move each of said support blocks along said first axes toward and away from said sheet support.

13. The apparatus as in claim 10 further including means mounting said support block and acting on said stop assembly to move said stop assembly in a first direction along said second axis away from said support block and in a second direction opposite to the first direction along a second axis toward said support block.

14. The apparatus as in claim 11 wherein said means for mounting said second member includes means mounting said support block and acting on said first member to move said first member in a first direction along said second axis away from said support block and in a second direction opposite to the first direction toward said support block.

* * * * *